(12) United States Patent
Tao et al.

(10) Patent No.: US 9,198,446 B2
(45) Date of Patent: Dec. 1, 2015

(54) CHOCOLATE PRODUCTION METHOD AND APPARATUS

(71) Applicant: Temple University—of the Commonwealth System of Higher Education, Philadelphia, PA (US)

(72) Inventors: Rongjia Tao, Cherry Hill, NJ (US); Hong Tang, Philadelphia, PA (US)

(73) Assignee: Temple University—of the Commonwealth System of Higher Education, Philadelphia, PA (US)

( * ) Notice: Subject to any disclaimer, the term of this patent is extended or adjusted under 35 U.S.C. 154(b) by 0 days.

(21) Appl. No.: 14/708,361

(22) Filed: May 11, 2015

(65) Prior Publication Data
US 2015/0237880 A1   Aug. 27, 2015

Related U.S. Application Data

(62) Division of application No. 13/755,033, filed on Jan. 31, 2013, now Pat. No. 9,044,036.

(60) Provisional application No. 61/592,648, filed on Jan. 31, 2012.

(51) Int. Cl.
*A23C 3/07* (2006.01)
*A23G 1/00* (2006.01)

(52) U.S. Cl.
CPC ............ *A23G 1/0006* (2013.01); *A23V 2002/00* (2013.01)

(58) Field of Classification Search
CPC ................................ A23G 1/0046; A23G 1/18
USPC ................... 137/13, 814, 827; 166/248, 304; 204/554, 563, 565, 573, 660, 672, 673; 425/4, 449; 99/287, 330, 451
See application file for complete search history.

(56) References Cited

U.S. PATENT DOCUMENTS

| | | | |
|---|---|---|---|
| 3,496,837 | A | 2/1970 | McEuen et al. |
| 3,724,543 | A | 4/1973 | Bell et al. |
| 3,880,192 | A | 4/1975 | Denizov et al. |
| 4,037,655 | A | 7/1977 | Carpenter |
| 4,203,398 | A | 5/1980 | Maruoka |

(Continued)

FOREIGN PATENT DOCUMENTS

| | | |
|---|---|---|
| RU | 2 083 915 | 7/1997 |
| WO | WO 2010/012032 | 2/2010 |

OTHER PUBLICATIONS

International Search Report and Written Opinion for PCT/US2013/023988 mailed Jun. 17, 2013.

(Continued)

*Primary Examiner* — Thien S Tran
(74) *Attorney, Agent, or Firm* — RatnerPrestia

(57) ABSTRACT

The present invention relates to a method and an apparatus for producing a chocolate product. The method includes delivering liquid chocolate having a viscosity through a pipe along a delivery path to a production station for producing the chocolate product. The liquid chocolate includes solid particles suspended within the liquid chocolate. The method changes the viscosity of the liquid chocolate by applying an electric field to the liquid chocolate in a direction along the delivery path of a strength and duration determined to aggregate the suspended solid particles into streamlined shapes extending along the direction of the delivery path.

20 Claims, 9 Drawing Sheets

(56) References Cited

U.S. PATENT DOCUMENTS

| | | | |
|---|---|---|---|
| 4,208,440 A | 6/1980 | Schmidt | |
| 4,254,800 A | 3/1981 | Masaki | |
| 5,052,491 A | 10/1991 | Harms et al. | |
| 5,185,086 A | 2/1993 | Kaali et al. | |
| 5,332,588 A | 7/1994 | Capodieci | |
| 5,480,522 A | 1/1996 | Ibbott | |
| 5,673,721 A | 10/1997 | Alcocer | |
| 5,676,995 A | 10/1997 | Cully et al. | |
| 2003/0089596 A1 | 5/2003 | Tao et al. | |
| 2003/0102123 A1 | 6/2003 | Wittle et al. | |
| 2004/0013776 A1 | 1/2004 | Whitehouse et al. | |
| 2004/0069154 A1* | 4/2004 | Stefanoni | 99/408 |
| 2007/0207232 A1* | 9/2007 | Nelson et al. | 425/4 R |
| 2007/0256631 A1* | 11/2007 | Lintner et al. | 118/24 |
| 2008/0257414 A1 | 10/2008 | Tao et al. | |
| 2010/0229955 A1* | 9/2010 | Bell | 137/13 |
| 2011/0217432 A1 | 9/2011 | Krnic et al. | |

OTHER PUBLICATIONS

Malcolm W. Browne, "Chocolate: The Stuff of Shock Absorbers?" NYT, Sep. 24, 1996.

International Preliminary Report on Patentability issued in PCT/US2013/023988 dated Aug. 5, 2014.

\* cited by examiner

CHOCOLATE PRODUCTION METHOD AND APPARATUS

CROSS REFERENCE TO RELATED APPLICATIONS

This application is a U.S. Divisional Application of U.S. patent application Ser. No. 13/755,033, filed Jan. 31, 2013 which claims priority to U.S. Provisional Application No. 61/592,648, filed Jan. 31, 2012. The contents of such applications are incorporated by reference herein.

FIELD

The present invention relates to chocolate production methods and apparatus.

SUMMARY

The present invention relates to a method and an apparatus for producing a chocolate product. The method includes delivering liquid chocolate having a viscosity through a pipe along a delivery path to a production station for producing the chocolate product. The liquid chocolate includes solid particles suspended within the liquid chocolate. The method changes the viscosity of the liquid chocolate by applying an electric field to the liquid chocolate in a direction along the delivery path to aggregate the suspended solid particles into streamline shapes arranged in short chains extending along the direction of the delivery path.

BACKGROUND

Chocolate contains antioxidants and therefore may provide health benefits. Conventional chocolate products contain excess fat which may lead to health concerns such as obesity. In fact, most chocolate products contain 25% to 35% fat content.

In general, liquid chocolate used to manufacture chocolate products includes excess melted fat (e.g. cocoa butter) that is purposely added to the liquid chocolate in an attempt to lower the viscosity for manufacturing purposes. This excess melted fat is used because even at the chocolate melting temperature, the viscosity of liquid chocolate may be too high for manufacturing, Thus, an unhealthy amount of fat may be added to the liquid chocolate for the purposes of reducing the viscosity during manufacturing.

DETAILED DESCRIPTION

The present invention provides methods and systems for reducing the viscosity of liquid chocolate as it is flowing (e.g. through a metal or plastic pipe) or coating a product during production of a chocolate product. Specifically, an electric field is applied along the direction of the flow of the liquid chocolate (e.g. along a direction of a delivery path through the pipe delivering liquid chocolate to a production station that produces chocolate products) at a specified strength and duration in order to aggregate solid particles suspended within the liquid chocolate. As the particles aggregate into streamlined shapes along the flow direction, the viscosity of the liquid chocolate decreases. The size of the streamlined aggregates is controlled by the combination of electric field strength and duration. Embodiments of the methods and systems described herein allow for control of liquid chocolate viscosity without the need to add excess melted fat.

Figure 1:
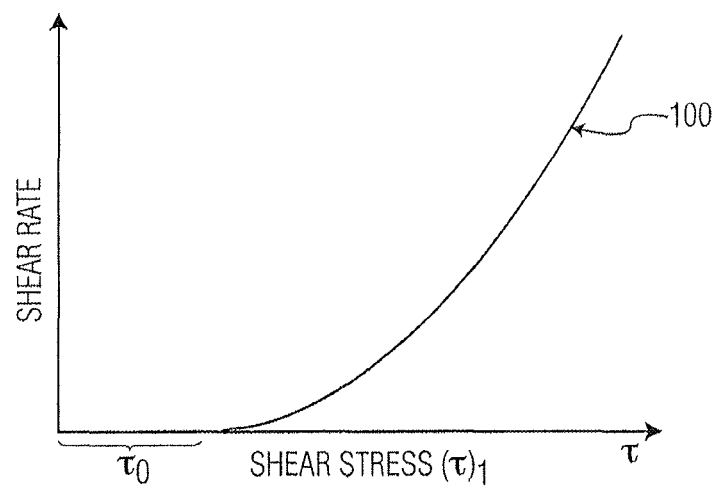
FIG. 1 is a graph depicting the relationship between shear stress and shear rate for liquid chocolate according to an embodiment of the present invention.

Liquid chocolate is a suspension comprised of solid particles (e.g. sugar particles, cocoa particles, milk particles, etc.) suspended in a liquid that is typically melted fat (e.g. cocoa butter or an equivalent). In general, liquid cocoa butter behaves as a Newtonian fluid. However, with the addition of the suspended particles, the liquid chocolate deviates from Newtonian behavior. In general, the shear stress of the liquid chocolate has pseudo plastic behavior. As shown in FIG. 1, the relationship between the shear stress and the shear rate is close to exponential (i.e. it is not linear), and can be modeled by the Casson Model shown in equation 1 below.

$$\sigma^{0.5} = \sigma_0^{0.5} + K_1(\dot{\gamma})^{0.5} \qquad \text{(Equation 1)}$$

where $\sigma$ is the shear stress, $\sigma_0$ is the yield shear stress, $\dot{\gamma}$ is the shear rate and $\kappa_1$ is a constant. From the Casson model it is found that the viscosity $\eta$ of liquid chocolate (described in equation 2) decreases as the shear rate increases.

$$\eta = \frac{\sigma}{\dot{\gamma}} \qquad \text{(Equation 2)}$$

Two characteristics of liquid chocolate is yield shear stress and its viscosity. The value of the yield shear stress is related to the minimum energy required to start the chocolate flowing. If the yield shear stress is high, the chocolate will be thicker and tend to stand up, which may be beneficial for putting on sweets or in producing chocolate morsels for baked cookies, for example. A low yield shear stress may be beneficial to give a thin coating of chocolate over a biscuit, for example.

In general, viscosity is a measure of resistance of a fluid which is being deformed by either shear or tensile stress. Viscosity determines the size of the pumps needed to pump the liquid chocolate through pipes and determines a coating thickness on a potential chocolate product. If a strong electric field is applied to liquid chocolate in a direction perpendicular to the shear or flow direction (see FIG. 2C), then the yield stress and viscosity are increased. As chocolate flows from section 202 in pipe 206 towards section 204, the electrical field applied by electrodes 208 and 210 (e.g. acting as a capacitor) induce the solid particles in the liquid chocolate to align with each other and form solid vertical columns 218 perpendicular to the flow by a dipolar interaction. This effect (i.e. the Winslow effect) increases the viscosity of the liquid chocolate exposed to the electric field and may completely stop the flow of chocolate through pipe 206 (i.e. vertical columns 218 perpendicular to the flow would block the flow from exiting the pipe at 204).

Figure 2A:
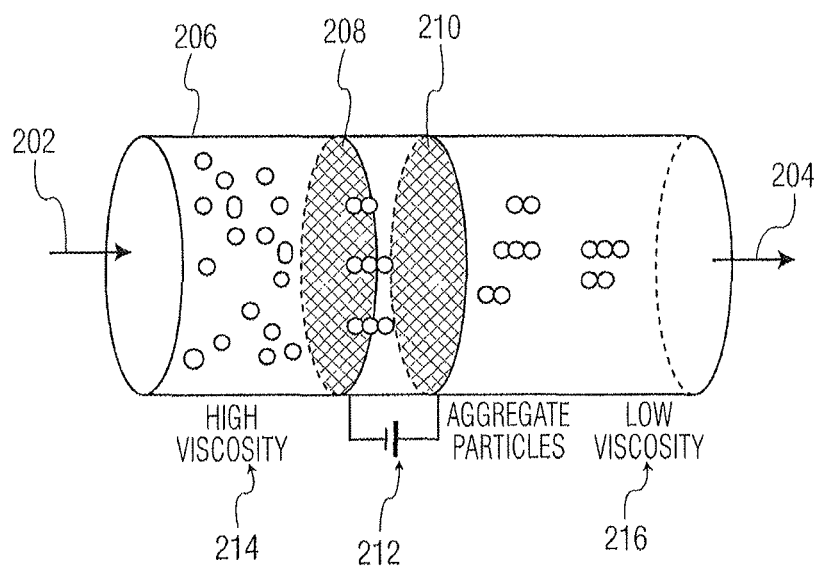
FIG. 2A is a side view of an electric field being applied to the liquid chocolate as it flows through a pipe according to an embodiment of the present invention.
Figure 2B:
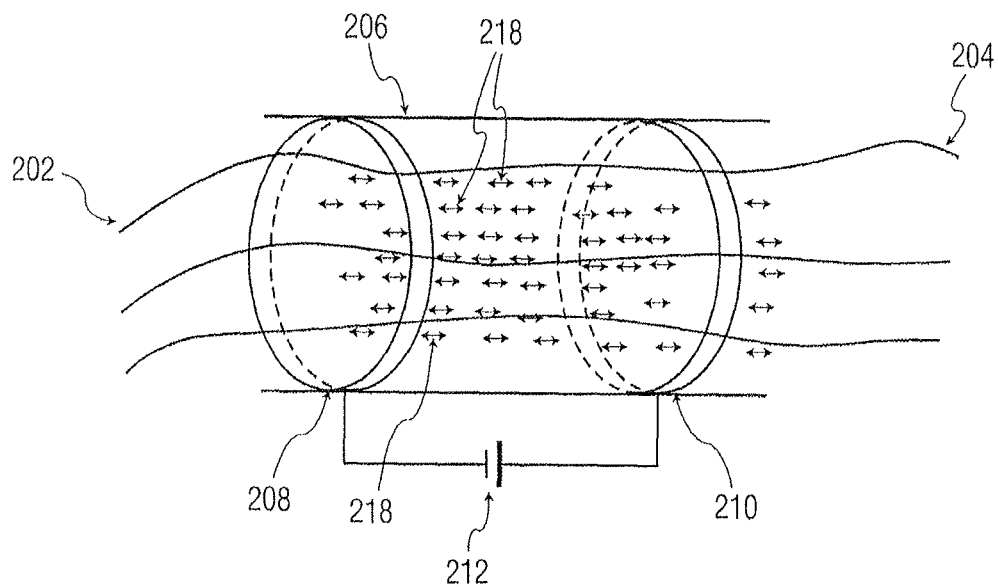
FIG. 2B is a side view of an electric field being applied to the liquid chocolate as it flows through a pipe according to another embodiment of the present invention.

By arranging the electrodes in a manner shown in FIGS. 2A and 2B, however, an electric field is generated between the electrodes in a direction parallel or anti-parallel (i.e. along the delivery path) to the flow of the chocolate through pipe 206. The delivery path may be flowing from a vessel which holds the liquid chocolate, through the pipe, to a production station that produces chocolate products at a desired viscosity.

Electrodes 208 and 210 are positioned within pipe 206. In one embodiment (FIG. 2A), electrodes 208 and 210 may be metallic meshes (e.g. a pair of grates) that allows the chocolate to flow through the electrodes along the delivery direction of the pipe. In another embodiment (FIG. 2B), electrodes 208 and 210 may be metallic rings, which are formed or mounted on the pipe's inner wall. Electrodes 208 and 210 may be electrically connected to an electrical power supply 212 that includes a power source and an electronic controller 232 for applying a voltage potential across electrodes 208 and 210, which results in an electric field between the electrodes. Electrodes 208 and 210 may also be coated with a non-conductive material (e.g. food grade plastic and/or rubber) to prevent the liquid chocolate from coming in direct contact with the electrodes. This coating may be useful in reducing electrical current flowing between the electrodes, and ensuring the integrity of the metallic electrodes over prolonged use.

In general, as the liquid chocolate flows through pipe 206, it has a relatively high viscosity in region 202, including 214. As it flows between electrodes 208 and 210, the solid particles suspended in the liquid chocolate begin to agglomerate into larger stream line aggregates resulting in a reduced viscosity in region 216 and 204.

Specifically, as shown in FIG. 2A and FIG. 2B, as the liquid chocolate flows from the left to the right along pipe 206, the liquid chocolate passes through the electric field between electrodes 208 and 210. The solid particles suspended in the liquid phase are polarized by the electric field. The induced dipolar interaction forces the particles to temporarily aggregate into short chains or ellipsoids that are along the flow direction. The size of the streamlined shapes may be relatively small (e.g. less than or equal to one hundred micrometers).

Figure 2C:
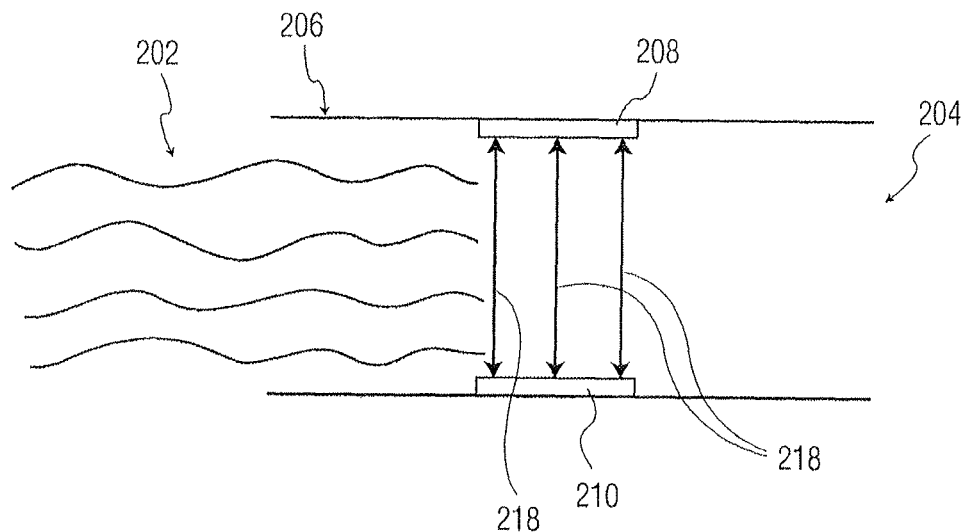
FIG. 2C is a side view of solid columns formed perpendicular to the flow of the liquid chocolate within the pipe according to an embodiment of the present invention.

In general, the aggregated chains in FIGS. 2A and 2B are different from the aggregated chains in FIG. 2C, because the aggregated chains in FIGS. 2A and 2B are small and are arranged along the flow direction of the liquid chocolate. The flow of these streamlined particle aggregates becomes organized in short chains along the pipe direction, so that the apparent viscosity of the liquid chocolate is reduced.

Thus, the relatively high viscosity liquid chocolate on the left side of the pipe in FIG. 2A and FIG. 2B is agglomerated between electrodes 208 and 210 which produce a liquid chocolate on the right side of pipe 206 having reduced viscosity. The reduced viscosity may gradually increase back to the original viscosity value over a period of time after being exposed to the electrical field.

Figure 2D:
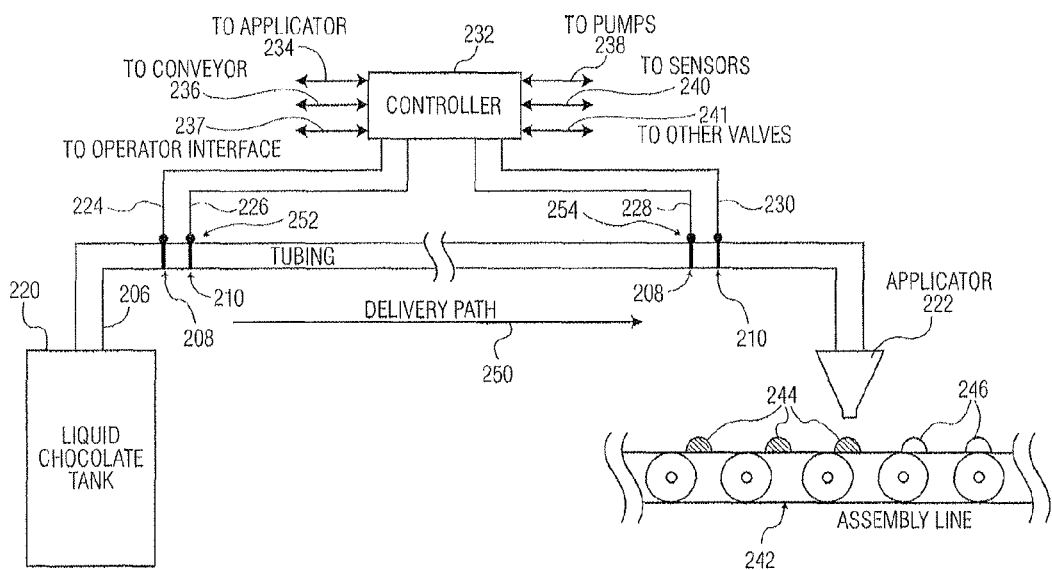
FIG. 2D is a side view of chocolate product manufacturing equipment applying an electric field to the liquid chocolate according to an embodiment of the present invention.

In operation, liquid chocolate passes through electrodes 208 and 210 positioned in at least one of a plurality of locations within a delivery pipe (e.g. a metal or plastic vessel) during the manufacture of chocolate products (e.g. candy bars, etc.). An example of chocolate product manufacturing equipment is shown in FIG. 2D where liquid chocolate is pumped from tank 220, through pipe 206 (along delivery path 250) and is applied to candy 246, for example, using applicator 222 to produce a chocolate product 244 (e.g. a chocolate covered candy bar).

Controller 232 (e.g. a microprocessor, a FPGA, a dedicated circuit, etc.) controls an electrical power supply (internal the controller or external (not shown)) to generate and apply the same voltage (e.g. of a predetermined magnitude) or different voltages to the electrode pairs at locations 252 and 254 (via wires 224, 226, 228 and 230). The application of the voltages to the electrodes produces an electric field at a specified polarity along the flow direction (i.e. the delivery path 250) of the liquid chocolate, which changes the viscosity of the liquid chocolate. The magnitude of the voltages applied to the electrodes along with the spacing between the electrodes determines the strength of the electric field.

It is noted that the electric field may be a direct current (DC) or an alternating current (AC) electric field that is applied to the liquid chocolate. It is also noted that the metallic meshes or metallic rings may be of essentially any configuration that provides an electric field along the flow direction of the liquid chocolate while allowing the liquid chocolate to pass along a flow path between the electrodes.

It is noted that the applied electric field is selected to be in a strength range that is conducive to reducing the viscosity of the liquid chocolate. For example, if the electric field strength is too small, reduction in viscosity may be insignificant or may not occur at all. If the electric field strength is too large, the viscosity may actually be increased.

It is noted that the duration of the electric field is also chosen to be in a range that is conducive to reducing the viscosity of the liquid chocolate. In one example, after the applied electric field strength is selected, an appropriate duration of the field application to the liquid chocolate may then be selected. This time duration may be related to the strength of electric field. For example, if the field is first selected to be strong, the duration may then be selected to be short. In another example, the electric field duration may be selected first, and then an appropriate electric field strength may be selected based on the duration. In general, by selecting an appropriate combination of electric field strength and electric field duration, an optimal viscosity reduction for liquid chocolate may be attained.

In one example, controller 232 may be programmed or controlled by an operator to ensure that a predetermined viscosity of the liquid chocolate flowing through pipe 206 is obtained. For example, controller 232 may be programmed to deliver liquid chocolate at a desired viscosity to applicator 222 to ensure that candy 246 on assembly line 242 are coated properly to produce desired chocolate products 244. These parameters along with other parameters such as temperature may be utilized by the controller 232 to determine an electric field strength and a duration to obtain a predetermined viscosity of the liquid chocolate that is beneficial for producing chocolate products such as a candy bar.

In some products, a thicker chocolate may be desired while in other products, a thinner chocolate may be preferred. Thus, the viscosity of the liquid chocolate may be controlled depending on requirements of the chocolate products.

Sensors (not shown) such as flow rate and/or temperature sensors may be implemented in the pipe to determine the viscosity of the liquid chocolate at one or more locations during the manufacturing process. In another example, the electrical power being consumed by the pump may also be used as an indicator of flow rate and/or viscosity of the chocolate (i.e. high power consumption may indicate high viscosity). This data may then be utilized by the controller 232 to further control the electric field applied to electrodes 208 and 210. For example the liquid chocolate may be maintained below a predetermined viscosity level to ensure proper functioning of the manufacturing equipment.

It is shown in FIG. 2D that the controller may communicate (i.e. receive and/or transmit information) to control various pieces of equipment in the manufacturing process using one or more control lines. These (wired or wireless) control lines may include, but are not limited to, chocolate applicator line 234, conveyor belt line 236, operator interface line 237, pump line 238, sensor line 240 and/or valve line 241.

In one example, the controller may control the production equipment by controlling the electric field applied to the liquid chocolate, pumps pumping the liquid chocolate through the pipe, applicators applying the liquid chocolate to the candy products, conveyor belts moving candy for application of liquid chocolate, heating devices heating the liquid chocolate, sensors for detecting various characteristics of the liquid chocolate (e.g. temperature, flow rate, viscosity, etc.), valves for allowing the liquid chocolate to flow through pipes and applicators, valves for mixing ingredients (e.g. melted fat) into the liquid chocolate and a user interfaces for interfacing (i.e. inputting and outputting information) to an operator.

Figure 3A:
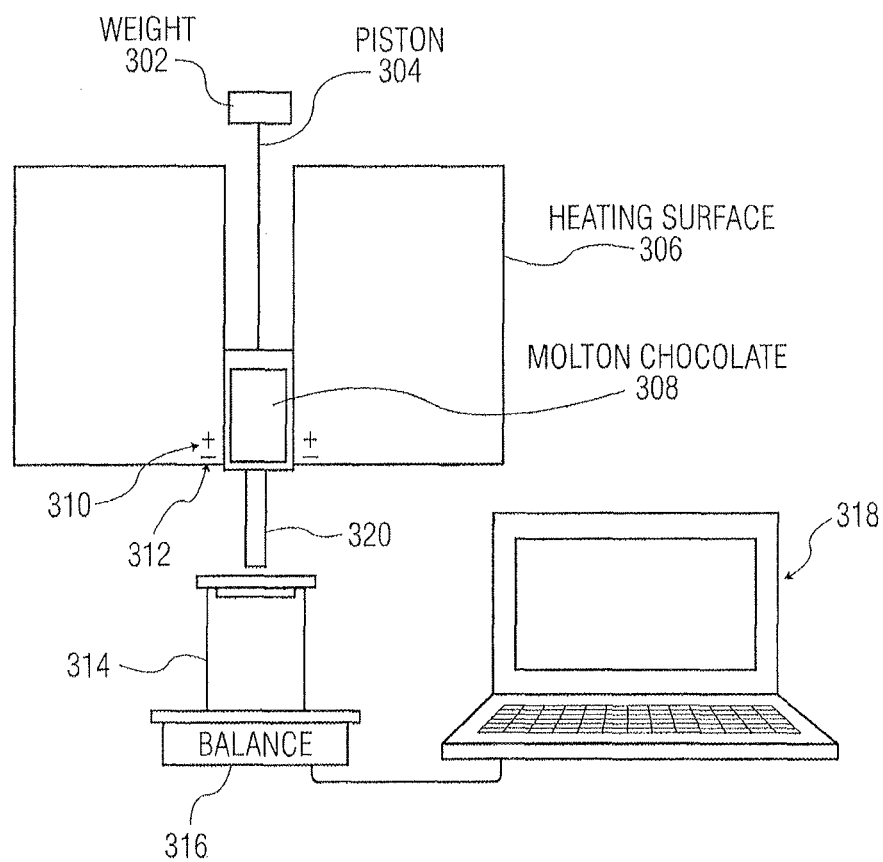
FIG. 3A is a system diagram of a test bench utilized to measure the flow rate of the liquid chocolate as an electric field is applied according to an embodiment of the present invention.

FIG. 3A is a test bench setup that was utilized to test the viscosity of liquid chocolate in the presence of an electric field. As shown in FIG. 3A, a heating surface 306 maintains the chocolate in a liquid form. The liquid chocolate 308 is then forced through metallic meshes 310 and 312 by a weight 302 and piston 304. As the liquid chocolate 308 is forced between electrodes 310 and 312, it is exposed to an electric field if a voltage is applied to the electrodes and its viscosity is reduced (i.e. its flow rate is increased if an electric field of a desired strength and duration is applied). The liquid chocolate with low viscosity is then collected in a container 314. The flow rate is then measured by a computer 318 connected to a balance 316.

In one experiment, the liquid chocolate is maintained around 40° C. utilizing heating surface 306. Under gravity, the liquid chocolate flowed through the metallic meshes 310 and 312 which applied a predetermined electric field in the flow direction of the chocolate, The balance 316 measured the liquid chocolate's mass as a function of time. This allowed the flow rate through pipe 320 to be determined.

Figures 4A, 4B:
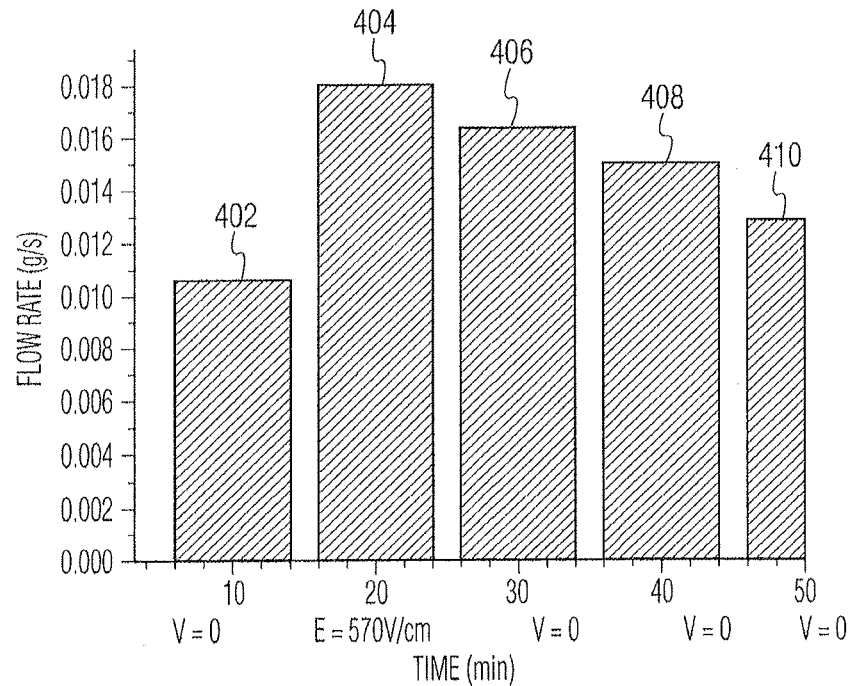
FIG. 4A is a graph depicting the flow rate versus time as an electric field is applied to the liquid chocolate in the test bench of FIG. 3A according to an embodiment of the present invention.
FIG. 4B is a table depicting the electric field application time versus strength as an electric field is applied to the liquid chocolate in the test bench of FIG. 3B according to an embodiment of the present invention.

FIG. 4A shows a graph of the flow rate of the liquid chocolate (402, 404, 406, 408 and 410) versus time for the test bench in FIG. 3A. For the data in FIG. 4A, there was no additional weight applied. The liquid chocolate first flowed down through the pipe without any electric field being applied. The flow rate was approximately 0.0106 g/s (see 402) indicating that the viscosity of the liquid chocolate is about 41.3 Pa·s. After an electric field of 575 V/cm was applied, the flow rate was increased to 0.01798 g/s (see 404) which reduced the viscosity to 24.46 Pas. (i.e. a 41% decrease in viscosity after being exposed to the electric field). In this experiment, the liquid chocolate took approximately 1 minute to flow by the two electrodes and into container 314.

After 10 minutes, the electric field was turned off, and the flow rate began to decrease indicating that the reduced viscosity gradually returned to its original value (i.e. see data 406, 408 and 410 where the flow rate gradually decreases over time after the electric field has been turned off). In other experiments, the electric field was reapplied to the liquid chocolate and the viscosity reduction was repeated.

Figure 3B:
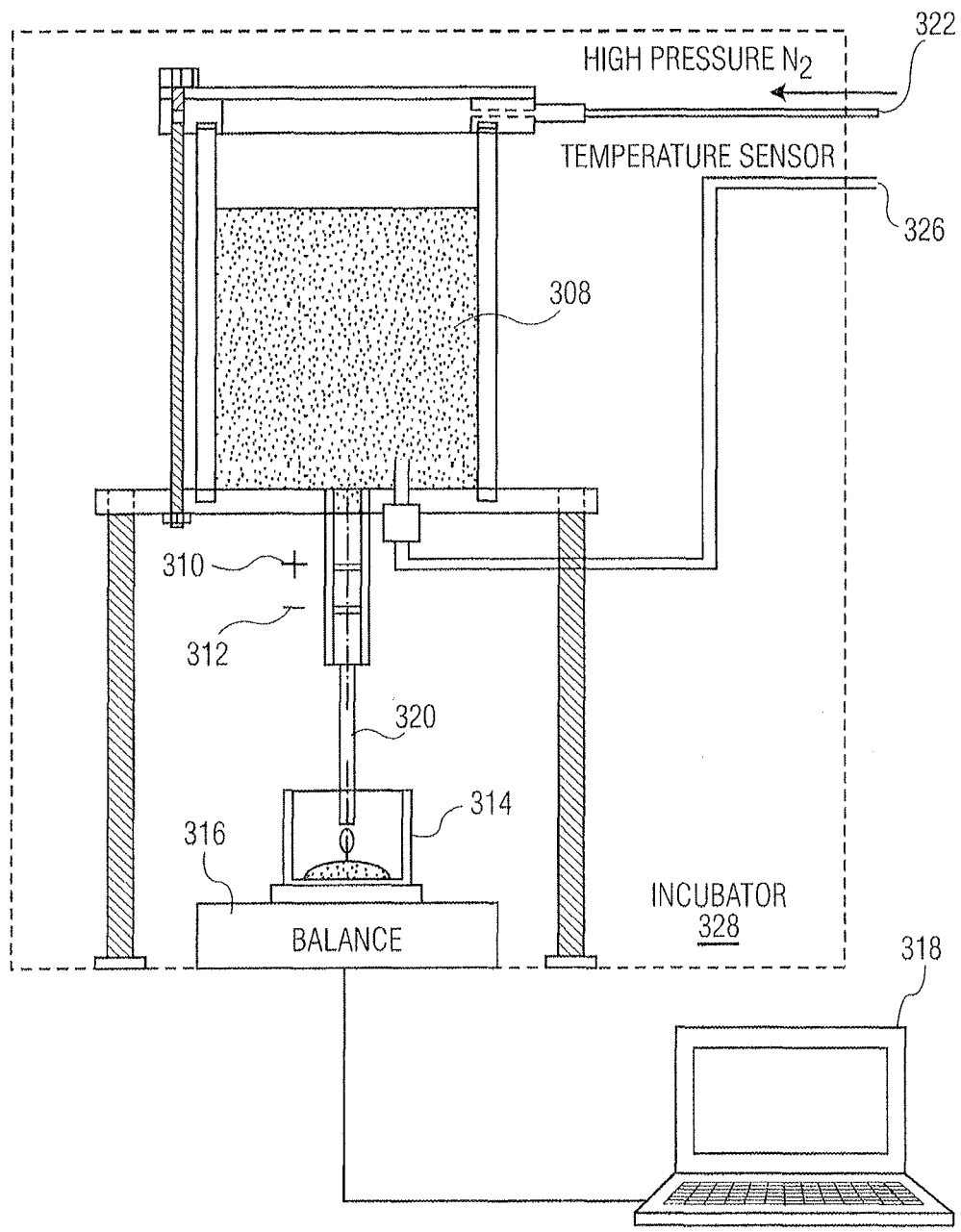
FIG. 3B is a system diagram of another test bench utilized to measure the flow rate of the liquid chocolate as an electric field is applied according to an embodiment of the present invention.

FIG. 3B is another test bench similar to the test bench in FIG. 3A. However, the test bench in FIG. 3B uses pressurized gas (not a weight) to force the liquid chocolate through pipe 320. Also, the test bench in FIG. 3B is located inside an incubator 328 to keep the chocolate at a desired temperature. Heating surface 306 is therefore not needed in this test bench.

In general, pressurized gas (e.g., nitrogen) under control of computer 318 is applied to liquid chocolate 308 through pipe 322. In response to the applied pressure, liquid chocolate 308 is forced through electrified meshes 310/312, through tube 320 and into container 314 where its weight is measured by balance 316. The test bench in FIG. 3B also may include a temperature sensor 326 that allows the computer to monitor the temperature of the liquid chocolate during the testing process.

FIG. 48 shows the relationship between the application time of the electric field and the optimal electric field strength for the test bench in FIG. 3B. In general, as the application time increases, the strength of the electric field decreases (i.e., the longer it takes for the chocolate to flow through the electric field, the lower the electric field strength needs to be). This inverse relationship is shown in rows 412, 414, 416, 418, 420 and 422 of the table in FIG. 48.

Figure 4C:
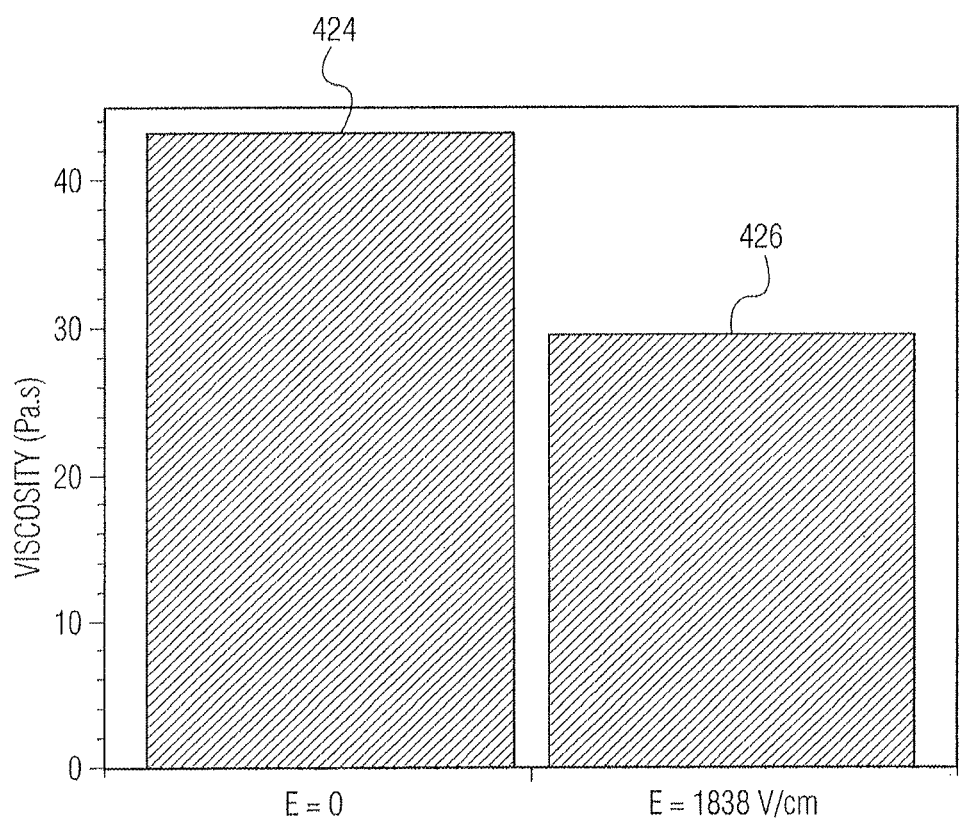
FIG. 4C is a graph depicting the viscosity versus time as an electric field is applied to the liquid chocolate in the test bench of FIG. 3B according to an embodiment of the present invention.

FIG. 4C shows a graph of the viscosity of the liquid chocolate (424 and 426) versus time for the test bench in FIG. 3B. In one example, (corresponding to row 414 in FIG. 48) a chocolate sample at 40° C. took 9.37 seconds to flow through an electric field with a strength of 1838 V/cm. In this example, the viscosity was reduced from 43.23 Pa·s (see 424) to 29.53 Pa·s (see 426). This particular electric field application produced a 31.7% reduction in viscosity.

For tempered chocolate, it was found that the electric field needed to be slightly higher. In general, to temper chocolate, solid chocolate is shaved. To produce fine shavings, a mesh is used to filter the particles. Solid chocolate with diameter less than a set size (e.g., 150 micro-meters) are used as seeds. About 1 kg chocolate was melted at 40° C. and cooled down to 30° C. After 10 g fine solid chocolate was mixed, the experiment using the test bench began. It is noted that the viscosity of the tempered chocolate increases very fast. It solidifies in about 30 minutes. Within this period, however, an electric field may be applied to reduce its viscosity.

Figure 4D:
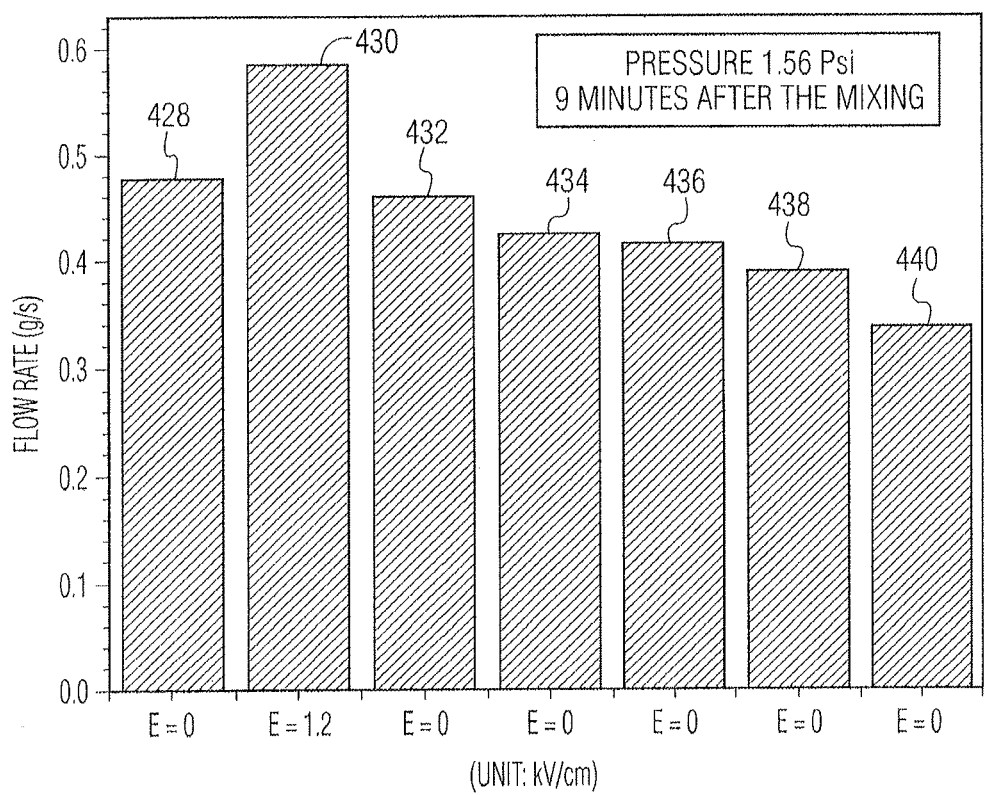
FIG. 4D is a graph depicting the flow rate versus time as an electric field is applied to the liquid chocolate in the test bench of FIG. 3B according to an embodiment of the present invention.
Figure 4E:
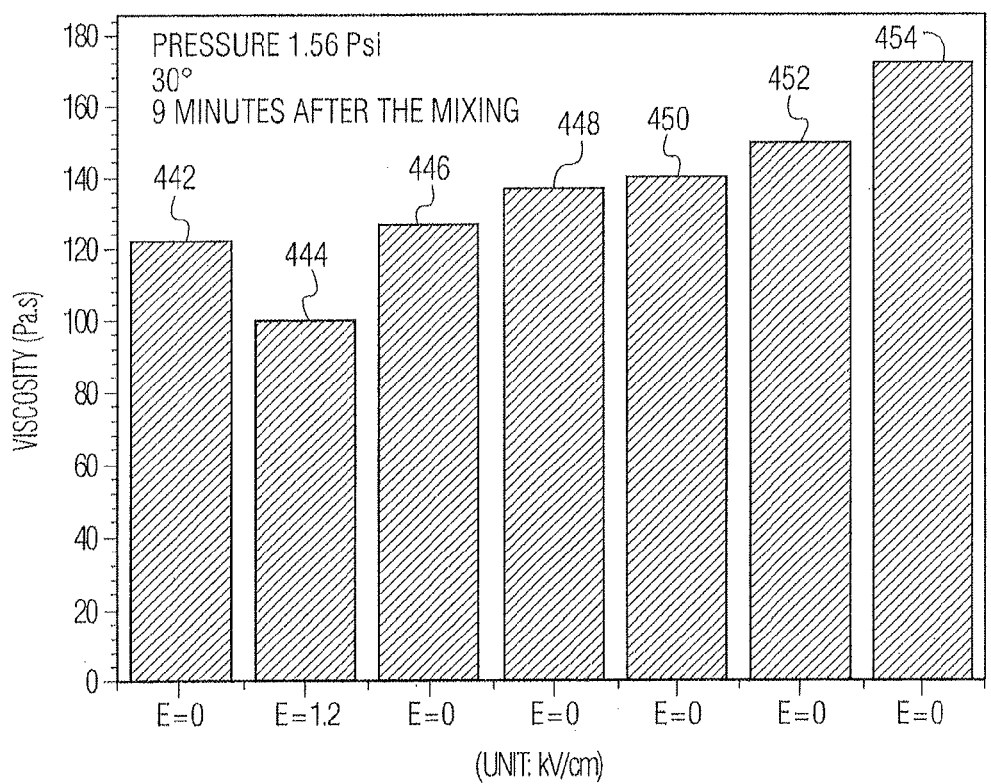
FIG. 4E is a graph depicting the viscosity versus time as an electric field is applied to the liquid chocolate in the test bench of FIG. 3B according to an embodiment of the present invention.

FIGS. 4D and 4E show graphs of flow rate (428, 430, 432, 434, 436, 438 and 440) and viscosity (442, 444, 446, 448, 450, 452 and 454) versus time respectively for the tempered chocolate. As shown in FIG. 4D, nine minutes after the mixing, the flow rate was 0.477545 g/s (see 428) under 1.56 Psi of pressure. When the electric field 1.2 kV/cm was turned on, the flow rate increased to 0.584745 g/s (see 430) (an increase of 22.45%). After 100 seconds of electric field application, the electric field was turned off and the corresponding flow rate was 0.465407 g/s (see 432). The flow rate was measured every 30 seconds thereafter. In about 180 seconds, the flow rate decreased to 0.33801 g/s (see 440) (reduced by 27.3%). This indicated that the tempered chocolate was solidifying.

From the flow rate, it was found that the viscosity (see FIG. 4E) was about 121.82 Pa·s (see 442) at nine minutes after the mixing. When an electric field of 1.2 kV/cm was applied, the viscosity was down to 99.487 Pa·s (see 444). After the electric field was turned off, the viscosity was 125.0 Pa·s (see 446). In another three minutes, the viscosity was increased to 172.1 Pa·s (see 454).

It is noted that the inventors have discovered that a suitable range for the electric field is from 100 V/cm to 6000 V/cm, and works particularly well in the range of 500 V/cm to 800 V/cm for some types of chocolate (e.g. Milk Chocolate available from Hershey of Hershey Pa.). If the electric field applied is too weak, there may be no noticeable viscosity reduction. On the other hand, if the applied electric field is too strong, the viscosity may actually increase. Because the liquid chocolate has a strong electrorheological effect (ER) the solid structure aggregates may become too large if exposed to an electrical field that is too strong, which would lead to increased viscosity (i.e. if the aggregates increase from micro-meter size to a larger macro-scopic size).

As described above, the duration of the electric field may be chosen based on the selected strength of the electric field (i.e. if the field is stronger, then the duration may be shortened) or visa versa. It is also noted that the duration of the electric field applied to liquid chocolate is equal to the time for the liquid chocolate to pass through the electric field. This duration can be changed if needed by adjusting the flow rate of the liquid chocolate (e.g. increasing/decreasing pump power), and/or by increasing/decreasing the gap between the two electrodes. By selecting a combination of an electric field strength and a duration of the field, viscosity reduction can be optimized for the flow of liquid chocolate through a pipe. It is furthermore noted that the electric current flowing between the meshes in the test benches was found to be very small (e.g., a couple of micro amperes). This indicates that the system is energy efficient while reducing the viscosity of the chocolate.

Although the invention is illustrated and described herein with reference to specific embodiments, the invention is not intended to be limited to the details shown. Rather various modifications may be made in the details within the scope and range of equivalence of the claims and without departing from the invention.

The invention claimed is:

1. A method for producing a chocolate product, the method comprising:
    flowing, by a chocolate delivery pipe, liquid chocolate having a viscosity along a delivery path to a production station for producing the chocolate product, the liquid chocolate including solid particles suspended in the liquid chocolate;
    applying an electric field to the liquid chocolate, by at least two food grade electrodes integrated into the chocolate delivery pipe, to change the viscosity of the liquid chocolate, the electric field being applied in a direction along the delivery path of a strength and duration determined to aggregate the solid particles into streamlined shapes extending along the direction of the delivery path; and
    controlling, by a controller coupled to the at least two electrodes, the strength and duration of the electric field applied to the liquid chocolate to reduce the viscosity to a predetermined level.

2. The method of claim 1, further comprising:
    controlling, by the controller, a flow rate of the liquid chocolate to adjust the duration during which the electric field is applied to the liquid chocolate.

3. The method of claim 1, further comprising:
    adjusting a spatial gap between the electrodes to control the duration during which the electric field is applied to the liquid chocolate.

4. The method of claim 1, further comprising:
    controlling, by the controller, an amount of melted fat included in the liquid chocolate based on the electric field.

5. The method of claim 1, further comprising:
    measuring, by a sensor located in the chocolate delivery pipe, a flow rate or a viscosity of the liquid chocolate; and
    controlling, by the controller, the strength and the duration for applying the electric field to the liquid chocolate based on the determined flow rate or the determined viscosity of the liquid chocolate along the delivery path.

6. The method of claim 5, further comprising:
    pumping, by a pump, the liquid chocolate through the chocolate delivery pipe; and
    controlling, by the controller, a speed of the pump based on a signal received from a sensor located in the chocolate delivery pipe.

7. The method of claim 1, further comprising:
    changing, by the controller, the viscosity of the liquid chocolate by applying the electric field to the liquid chocolate in a strength range of 300 V/cm to 6000 V/cm.

8. The method of claim 1, further comprising:
    determining, by the controller, the strength and duration for applying the electric field to the liquid chocolate based on at least one of:
        a predetermined consistency of the chocolate product,
        a predetermined fat content of the chocolate product, and
        a type of chocolate used in the production of the chocolate product.

9. The method of claim 1, further comprising:
    controlling, by the controller, a tempering device to temper the liquid chocolate prior to delivering the liquid chocolate through the pipe.

10. The method of claim 9, further comprising:
    tempering, by the tempering device, the liquid chocolate by:
        heating the liquid chocolate to a predetermined temperature,
        filtering solid particles from the heated liquid chocolate, and
        cooling the liquid chocolate to another predetermined temperature.

11. A method for producing a chocolate covered candy product, the method comprising:
    flowing, by a pump and a chocolate delivery pipe, liquid chocolate having a viscosity along a delivery path to an applicator, the liquid chocolate including solid particles suspended in the liquid chocolate;

applying an electric field to the liquid chocolate, by at least two food grade electrodes integrated into the chocolate delivery pipe, to change the viscosity of the liquid chocolate, the electric field being applied in a direction along the delivery path of a strength and duration determined to aggregate the solid particles into streamlined shapes extending along the direction of the delivery path;

controlling, by a controller, the strength of the electric field, the duration of the electric field and a pumping speed of the pump to supply liquid chocolate at a predetermined reduced viscosity to the applicator; and applying, by the applicator, the liquid chocolate at the predetermined reduced viscosity to a candy product to produce the chocolate covered candy product.

12. The method of claim 11, further comprising:

applying, by at least two other electrodes integrated into the chocolate delivery pipe for changing the viscosity of the liquid chocolate, another electric field to the liquid chocolate in a direction along the delivery path to the applicator.

13. The method of claim 11, further comprising:

sensing, by sensors integrated into the chocolate delivery pipe, a flow rate or a viscosity of the liquid chocolate; and controlling, by the controller, the strength and the duration for applying the electric field based on the determined flow rate or the determined viscosity of the liquid chocolate along the delivery path to the applicator.

14. The method of claim 11, further comprising:

determining, by the controller, a flow rate or a viscosity of the liquid chocolate based on electric power consumption of the pump.

15. The method of claim 11, further comprising:

controlling, by the controller, mixing of the liquid chocolate in a liquid chocolate tank based on the predetermined viscosity; and pumping, by the pump, the liquid chocolate from the liquid chocolate tank to the applicator.

16. The method of claim 11, further comprising:

displaying, by a display of an operator interface of the controller, information relating to the flow rate or viscosity of the liquid chocolate; and receiving, by an input terminal of the operator interface, an input from an operator to manually control the flow rate or viscosity of the liquid chocolate.

17. The method of claim 11, further comprising:

changing, by the controller, the viscosity of the liquid chocolate by applying the electric field to the liquid chocolate in a strength range of 300 V/cm to 1000 V/cm.

18. The method of claim 11, further comprising:

determining, by the controller, the strength and the duration for applying the electric field to the liquid chocolate based on at least one of:
- a predetermined consistency of the chocolate covered candy product,
- a predetermined fat content of the chocolate covered candy product, and
- a type of chocolate used in the production of the chocolate covered candy product.

19. The method of claim 11, further comprising:

controlling, by the controller, a tempering device to temper the liquid chocolate prior to delivering the liquid chocolate through the pipe.

20. The method of claim 19, further comprising:

tempering, by the tempering device, the liquid chocolate by:
- heating the liquid chocolate to a predetermined temperature,
- filtering solid particles from the heated liquid chocolate, and
- cooling the liquid chocolate to another predetermined temperature.

\* \* \* \* \*